(12) United States Patent
Liu et al.

(10) Patent No.: US 12,294,060 B2
(45) Date of Patent: May 6, 2025

(54) BATTERY MODULE AND VEHICLE

(71) Applicant: CONTEMPORARY AMPEREX TECHNOLOGY (HONG KONG) LIMITED, Hong Kong (CN)

(72) Inventors: Wenwen Liu, Fujian (CN); Weihua Mo, Fujian (CN); Yu Zou, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 386 days.

(21) Appl. No.: 17/564,972

(22) Filed: Dec. 29, 2021

(65) Prior Publication Data

US 2022/0123376 A1    Apr. 21, 2022

Related U.S. Application Data

(63) Continuation of application No. PCT/CN2020/119093, filed on Sep. 29, 2020.

(30) Foreign Application Priority Data

Nov. 19, 2019   (CN) .......................... 201921999711.9

(51) Int. Cl.
*H01M 10/42*   (2006.01)
*H01M 10/48*   (2006.01)
(Continued)

(52) U.S. Cl.
CPC ....... *H01M 10/425* (2013.01); *H01M 10/482* (2013.01); *H01M 10/486* (2013.01);
(Continued)

(58) Field of Classification Search
CPC ............. H01M 10/425; H01M 10/482; H01M 10/486; H01M 10/653; H01M 50/103;
(Continued)

(56) References Cited

U.S. PATENT DOCUMENTS 9,246,199 B2 *   1/2016   Wang .................. H01M 10/482
2015/0044511 A1   2/2015   Kim et al.
(Continued)

FOREIGN PATENT DOCUMENTS

CN    204029949 U      12/2014
CN    205985096   *    2/2017  .............. H01M 2/04
(Continued)

OTHER PUBLICATIONS

Machine English translation of CN 205985096 (Year: 2017).*
(Continued)

*Primary Examiner* — Michael L Dignan
(74) *Attorney, Agent, or Firm* — Scully, Scott, Muprhy & Presser, P.C.

(57) ABSTRACT

A battery module and a vehicle are provided. The battery module includes: a plurality of battery cells, where each battery cell includes a battery top cover; a thermally conductive sampling piece, where one end of the thermally conductive sampling piece fits snugly with and is fixedly connected to the battery top cover; a circuit board, disposed above the battery top cover, where another end of the thermally conductive sampling piece is connected to the circuit board; and a thermometric element, electrically connected to the circuit board, where the thermometric element is configured to collect a temperature signal of the thermally conductive sampling piece and transmit the temperature signal to the circuit board. The vehicle includes the battery module. The battery module provided in this application facilitates real-time and accurate collection of a battery temperature.

13 Claims, 4 Drawing Sheets

(51) Int. Cl.
  *H01M 10/653*   (2014.01)
  *H01M 50/103*   (2021.01)
  *H01M 50/147*   (2021.01)
  *H01M 50/209*   (2021.01)

(52) U.S. Cl.
  CPC ....... *H01M 10/653* (2015.04); *H01M 50/103* (2021.01); *H01M 50/147* (2021.01); *H01M 50/209* (2021.01); *H01M 2010/4271* (2013.01); *H01M 2220/20* (2013.01)

(58) Field of Classification Search
  CPC ............. H01M 50/147; H01M 50/209; H01M 2010/4271; H01M 2220/20; H01M 10/4257; H01M 50/15; H01M 50/262; H01M 50/284; Y02E 60/10
  See application file for complete search history.

(56) References Cited

U.S. PATENT DOCUMENTS

| | | | |
|---|---|---|---|
| 2017/0098867 A1* | 4/2017 | Zhao | H01M 10/486 |
| 2017/0194771 A1* | 7/2017 | Aoki | H01M 50/507 |
| 2019/0237817 A1* | 8/2019 | Hammerschmied | H01M 10/425 |
| 2020/0411919 A1* | 12/2020 | Friedrich | H01M 50/507 |
| 2021/0104797 A1 | 4/2021 | Cao et al. | |

FOREIGN PATENT DOCUMENTS

| | | |
|---|---|---|
| CN | 207116634 U | 3/2018 |
| CN | 207183457 U | 4/2018 |
| CN | 208723039 U | 4/2019 |
| CN | 209200108 U | 8/2019 |
| CN | 210607433 U | 5/2020 |
| CN | 210628357 U | 5/2020 |
| EP | 2835846 A1 | 2/2015 |
| EP | 3965210 A1 | 3/2022 |
| JP | 2013179094 A | 9/2013 |
| JP | 2016162717 A | 9/2016 |
| JP | 2017520095 A | 7/2017 |
| JP | 2019160467 A | 9/2019 |
| KR | 20160000743 U | 3/2016 |
| KR | 20170009964 A | 1/2017 |

OTHER PUBLICATIONS

Decision to Grant a Patent dated Jan. 9, 2024 received in Japanese Patent Application No. JP 2022-527799.
International Search Report and Written Opinion dated Dec. 30, 2020 received in International Application No. PCT/CN2020/119093.
Notice of Reasons for Refusal dated Jul. 10, 2023 received in Japanese Patent Application No. JP 2022-527799.
Extended European Search Report dated Apr. 14, 2022 received in European Patent Application No. EP 20889065.7.
Request for the Submission of an Opinion dated Feb. 5, 2024 received in Korean Patent Application No. KR 10-2022-7015227.

* cited by examiner

BATTERY MODULE AND VEHICLE

CROSS-REFERENCE TO RELATED APPLICATIONS

This application is a continuation of International Application No. PCT/CN2020/119093, filed on Sep. 29, 2020, which claims priority to Chinese Patent Application No. 201921999711.9, filed on Nov. 29, 2019 and entitled "BATTERY MODULE AND VEHICLE", which is incorporated herein by reference in its entirety.

TECHNICAL FIELD

This application relates to the technical field of battery preparation, and in particular, to a battery module and a vehicle.

BACKGROUND

A battery is a source of energy for an electric vehicle. To ensure high performance of the battery module and extend its service life, the battery module needs to be managed and controlled. A battery temperature exerts a relatively great impact on the battery in terms of battery capacity, voltage, internal resistance, charge and discharge efficiency, service life, safety, battery consistency, and the like. Therefore, the battery temperature needs to be monitored during use of the battery.

In related technologies, a thermistor is generally used as a temperature sensor to measure the battery temperature. The battery temperature is collected in an indirect measurement manner, for example, by connecting other conductive metal parts such as an aluminum or copper plate to an electrode terminal. A terminal voltage of the thermistor is sampled and read by using a voltage divider method, and a temperature value can be calculated according to a resistance-temperature relationship.

SUMMARY

A first aspect of this application provides a battery module, including:

a plurality of battery cells, where each battery cell includes a battery top cover;

a thermally conductive sampling piece, where one end of the thermally conductive sampling piece fits snugly with and is fixedly connected to the battery top cover; and a circuit board, disposed above the battery top cover, where another end of the thermally conductive sampling piece is connected to the circuit board; and a thermometric element, electrically connected to the circuit board, where the thermometric element is configured to collect a temperature signal of the thermally conductive sampling piece and transmit the temperature signal to the circuit board.

Therefore, an internal temperature of the battery cell can be reflected to the thermometric element through the thermally conductive sampling piece. The thermometric element transmits the measured temperature signal of the thermally conductive sampling piece to the circuit board to implement sampling of the temperature of the battery cell.

In some embodiments, the thermally conductive sampling piece includes a sampling board. The sampling board includes a first sampling board fitting snugly with the battery top cover, a third sampling board connected to the circuit board, and a second sampling board that connects the first sampling board and the third sampling board.

In some embodiments, the sampling board is bent. The first sampling board and the third sampling board are located on two sides of the second sampling board respectively, and extend in a direction away from the second sampling board.

In some embodiments, an avoidance hole is disposed at a position of joint between the thermally conductive sampling piece and the circuit board, and the thermometric element is located in the avoidance hole.

In some embodiments, a position limiting structure is disposed on the thermally conductive sampling piece. The position limiting structure is configured to limit a relative position between the circuit board and the thermally conductive sampling piece.

In some embodiments, the position limiting structure includes a stopper plate disposed on one side of the thermally conductive sampling piece. The stopper plate is snap-fastened to the circuit board.

In some embodiments, the stopper plate includes:

a first stopper plate, connected to the thermally conductive sampling piece, and extending toward a side away from the thermally conductive sampling piece; and a second stopper plate, connected to the first stopper plate, spaced apart from the thermally conductive sampling piece, and snap-fastened to the circuit board.

In some embodiments, the position limiting structure is disposed in pairs.

In some embodiments, the thermally conductive sampling piece is fixedly connected to the battery top cover by a fastener and/or a binder.

A second aspect of this application provides a vehicle, including:

a power source, where the power source provides power to the vehicle; and the battery module according to the first aspect of this application, where the battery module is configured to provide electrical power to the power source.

Based on the battery module provided in this application, a temperature sampling position is arranged on a surface of the battery top cover of the battery cell. Heat inside the battery cell can be quickly conducted to the battery top cover. The thermally conductive sampling piece is disposed on and fits snugly with the battery top cover. The thermometric element and the thermally conductive sampling piece are directly connected to the circuit board. The thermometric element detects the temperature of the thermally conductive sampling piece. In this way, the internal temperature of the battery cell can be reflected to the thermometric element through the thermally conductive sampling piece. The thermometric element transmits the measured temperature signal of the thermally conductive sampling piece to the circuit board to implement sampling of the temperature of the battery cell.

In some embodiments, the thermometric element is connected to the battery top cover through the thermally conductive sampling piece. A heat conduction path between the thermometric element and the battery top cover is simple. This facilitates real-time and accurate collection of the temperature of the battery cell, and helps to solve the problem that the collected sample temperature differs sharply from the actual temperature inside the battery cell when the temperature of the battery cell is collected through an electrical connecting plate.

In some embodiments, because the temperature collection of the battery cell is more accurate and faster, the problems caused by an excessive temperature difference between the sample temperature and the actual temperature are mitigated, where the problems include: power of an electric vehicle is prematurely reduced, the capacity of the battery pack is not fully utilized, a cruising range is reduced, and even the electric vehicle is unable to be started.

The vehicle according to this application includes the battery module according to this application, and possesses the same advantages as those of the battery module according to this application.

Exemplary embodiments of this application are described below in detail with reference to drawings to make other features and advantages of this application clearer.

BRIEF DESCRIPTION OF DRAWINGS

To describe the technical solutions in the embodiments of this application more clearly, the following outlines the drawings to be used in the description of the embodiments of this application. Apparently, the drawings outlined below are merely some embodiments of this application, and a person of ordinary skill in the art may derive other drawings from the outlined drawings without making any creative efforts.

The drawings described herein are intended to enable a further understanding of this application, and constitute a part of this application. The exemplary embodiments of this application and the description thereof are intended to interpret this application, but do not constitute any undue limitation on this application.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. The following description of at least one exemplary embodiment is merely illustrative, and is in no way intended as a limitation on this application or the use thereof. All other embodiments derived by a person of ordinary skill in the art based on the embodiments of this application without making any creative efforts fall within the protection scope of this application.

Unless otherwise expressly specified, the relative arrangement of parts and steps, numerical expressions, and numerical values set forth in the embodiments do not limit the scope of this application. Understandably, for ease of description, the sizes of various parts shown in the drawings are not drawn to actual scale. The technologies, methods, and devices known to a person of ordinary skill in the related art may be described without going into details, but as appropriate, such technologies, methods, and device are regarded as a part of the granted specification. In all the examples shown and discussed herein, any specific values are construed as merely exemplary rather than restrictive. Therefore, values in other examples of the exemplary embodiment may be different. It needs to be noted that similar reference numerals and letters indicate similar items in the following drawings. Therefore, once an item is defined in one drawing, the item does not need to be further discussed in subsequent drawings.

Understandably, in the context of this application, the terms such as "first" and "second" used to qualify parts are merely intended for ease of distinguishing the parts. Unless otherwise specified, no special meaning is ascribed to such terms. Therefore, the terms are not to be understood as a limitation on the protection scope of this application.

Understandably, in the context of this application, a direction or positional relationship indicated by the directional terms such as "before", "after", "upper", "lower", "left", "right", "vertical", "perpendicular", "horizontal", "top", and "bottom" is generally a direction or positional relationship based on the illustration in the drawings, and is merely intended for ease or brevity of description of this application. Unless otherwise specified to the contrary, such directional terms do not indicate or imply that the indicated device or component is necessarily in the specified direction or necessarily constructed or operated in the specified direction. Therefore, such terms are not to be understood as a limitation on the protection scope of this application. The directional terms "in" and "out" used in connection with a part mean inward and outward directions relative to the contour of the part.

When the battery temperature is measured by using the related technologies, a temperature difference between the measured sample temperature and an actual temperature inside a battery cell is relatively great. For a low-capacity battery cell, the temperature difference may reach ±5.0° C. For a high-capacity battery cell, the temperature difference may reach ±10° C., and errors are greater. An excessive temperature difference between the sample temperature and the actual temperature may cause a battery management system (BMS) of a battery pack containing the battery module to control the battery pack to reduce power prematurely, or even to cut off electricity. Consequently, the electric vehicle powered by the battery pack loses power, and a movement process of the electric vehicle is not controllable.

As shown in FIG. 1 to FIG. 8, an embodiment of this application provides a battery module. The battery module includes a plurality of battery cells 1, a thermally conductive sampling piece, a thermometric element 9, and a circuit board 4.

Each battery cell 1 includes a battery top cover 12. One end of the thermally conductive sampling piece fits snugly with and is fixedly connected to the battery top cover 12. The circuit board 4 is disposed above the battery top cover 12. Another end of the thermally conductive sampling piece is connected to the circuit board 4. The thermometric element 9 is electrically connected to the circuit board 4. The thermometric element 9 collects a temperature signal of the thermally conductive sampling piece and transmits the temperature signal to the circuit board 4.

In the battery module according to this embodiment of this application, a temperature sampling position is arranged on a surface of the battery top cover 12 of the battery cell 1. Heat inside the battery cell 1 can be quickly conducted to the battery top cover 12. The thermally conductive sampling piece is disposed on and fits snugly with the battery top cover 12. The thermometric element 9 and the thermally conductive sampling piece are directly connected to the circuit board 4. The thermometric element 9 detects the temperature of the thermally conductive sampling piece. In this way, the internal temperature of the battery cell 1 can be reflected to the thermometric element 9 through the thermally conductive sampling piece. The thermometric element 9 transmits the measured temperature signal of the thermally conductive sampling piece to the circuit board 4 to implement sampling of the temperature of the battery cell 1.

Internal heat of the battery cell 1 can be quickly conducted to the battery top cover 12, and the temperature of the battery top cover 12 is usually not inconsistent with the internal temperature of the battery cell 1 when working conditions are different. In addition, the thermometric element 9 is connected to the battery top cover 12 through the thermally conductive sampling piece. The heat conduction path between the thermometric element 9 and the battery top cover 12 is simple. This facilitates real-time and accurate collection of the temperature of the battery cell 1, and helps to solve the problem that the collected temperature differs sharply from the actual temperature inside the battery cell 1 when the temperature of the battery cell 1 is collected through an electrical connecting plate.

Because the temperature collection of the battery cell 1 is more accurate and faster, the problems caused by an excessive temperature difference between the sample temperature and the actual temperature are mitigated, where the problems include: power of an electric vehicle is prematurely reduced, the capacity of the battery pack is not fully utilized, a cruising range is reduced, and even the electric vehicle is unable to be started.

The following further describes embodiments of this application with reference to FIG. 1 to FIG. 8.

FIG. 1 to FIG. 4 show a structure of a battery module according to an embodiment of this application.

Figure 1:
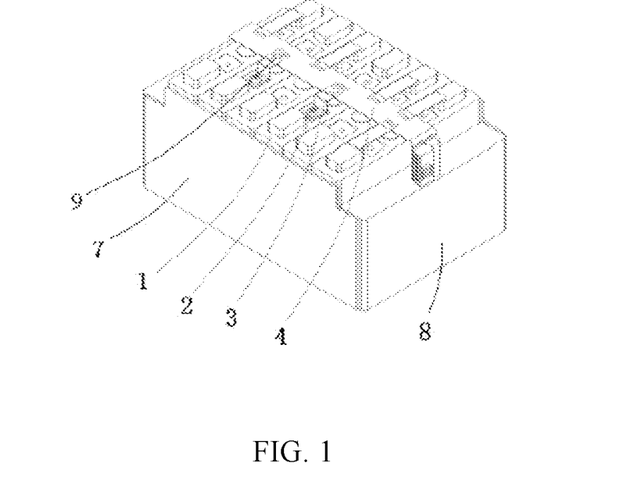
FIG. 1 is a schematic structural diagram of a battery module according to an embodiment of this application.

As shown in FIG. 1, the battery module includes battery cells 1, a screw 2, a thermally conductive sampling piece 3, a circuit board 4, a thermometric element 9, side plates 7, end plates 8, and an electrical connecting plate (not shown in the drawing). The circuit board 4 is a flexible circuit board.

The plurality of battery cells 1 are arranged in an array to form a battery module. For example, in FIG. 1, 6 battery cells 1 are arranged in an array of 1 column and 6 rows. Two side plates 7 are disposed outside two opposite lateral faces of the battery module respectively. Two end plates 8 are disposed outside two opposite end faces of the battery module respectively. The two side plates 7 and the two end plates 8 define an accommodation space that accommodates the battery module. Each electrical connecting plate connects different battery cells 1.

Figure 2:
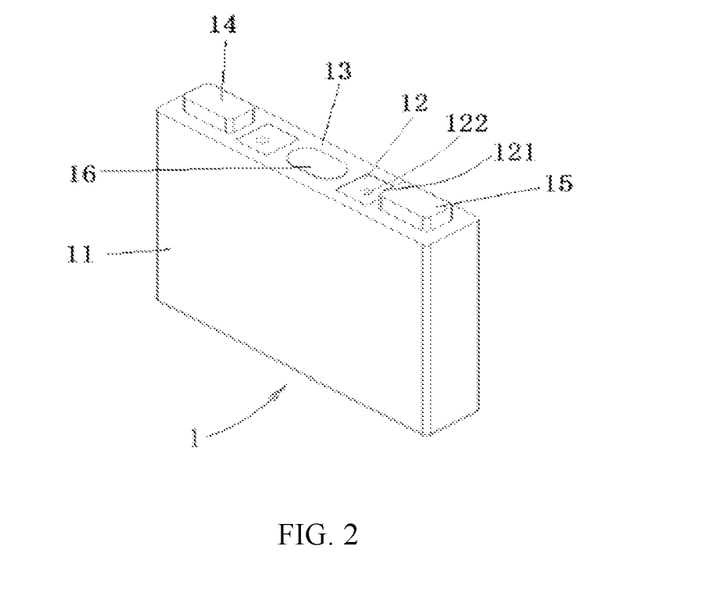
FIG. 2 is a schematic structural diagram of a battery cell of a battery module according to the embodiment shown in FIG. 1.
Figure 3:
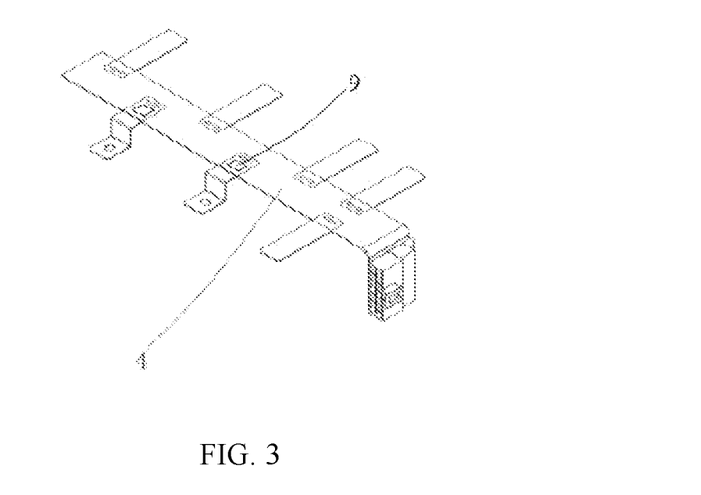
FIG. 3 is a schematic structural diagram of a composite structure formed by components such as a circuit board of a battery module and a thermally sampling piece connected to the circuit board according to the embodiment shown in FIG. 1.

As shown in FIG. 2, each battery cell 1 includes a housing 11, a battery top cover 12, an electrode assembly (not shown in the drawing), a top sheet 13, a positive terminal 14, a negative terminal 15, and an explosion-proof valve 16. The battery top cover 12 is disposed on a top of the housing 11, and combines with the housing 11 to define an accommodation portion that accommodates the electrode assembly. The positive terminal 14 and the negative terminal 15 are connected to a positive electrode and a negative electrode of the electrode assembly respectively, and protrude beyond the battery top cover 12. The explosion-proof valve 16 is located between the positive terminal 14 and the negative terminal 15. A temperature sampling region 121 is disposed on the battery top cover 12.

The top sheet 13 fits snugly with an upper surface of the battery top cover 12. A temperature collection opening is made on the top sheet 13. A part of the battery top cover 12, which is exposed at the temperature collection opening, is the temperature sampling region 121.

As shown in FIG. 1 and FIG. 2, in the battery module according to some embodiments, the temperature sampling region 121 is a square region arranged between the positive terminal 14 and the negative terminal 15. In this embodiment, the thermally conductive sampling piece 3 fits snugly with and is fixedly connected to the temperature sampling region 121 located between the explosion-proof valve 16 and the negative terminal 15.

In an embodiment not shown in the drawings, the position and shape of the temperature sampling region may vary depending on actual situations.

The thermometric element 9 is configured to collect the temperature of the thermally conductive sampling piece and form a battery temperature signal representing the temperature of the battery cell 1. The circuit board 4 is disposed above the battery top cover 12. The thermometric element 9 is connected to the circuit board 4, and transmits the battery temperature signal to the circuit board 4.

For example, the thermometric element 9 includes a thermistor, and may be a negative temperature coefficient (NTC) surface mount device (SMD) thermistor. The thermally conductive sampling element may be made of metal or a thermally conductive non-metallic material.

One end of the thermally conductive sampling piece 3 fits snugly with and is fixedly connected to the battery top cover 12. Another end of the thermally conductive sampling piece is connected onto the circuit board 4.

In some embodiments, the thermally conductive sampling piece includes a sampling board. The sampling board includes a first sampling board fitting snugly with the battery top cover, a third sampling board connected to the circuit board, and a second sampling board that connects the first sampling board and the third sampling board. The shape of the sampling board may be bent. For example, in some embodiments, the first sampling board and the third sampling board are located on two sides of the second sampling board respectively, and extend in a direction away from the second sampling board.

Figure 4:
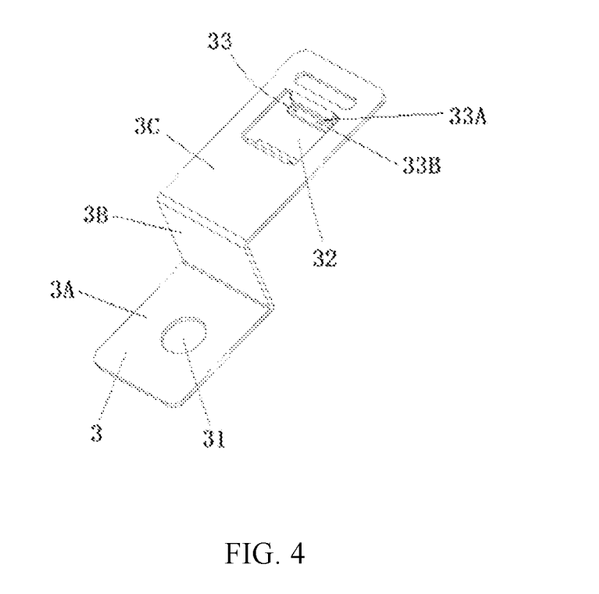
FIG. 4 is a schematic structural diagram of a thermally conductive sampling piece of a battery module according to the embodiment shown in FIG. 1.

As shown in FIG. 4, the thermally conductive sampling piece 3 includes the sampling boards. The sampling board includes a first sampling board 3A, a second sampling board 3B, and a third sampling board 3C that are sequentially connected in a bent shape. The first sampling board 3A and the third sampling board 3C each extend from the second sampling board 3B toward a side away from a face of the second sampling board 3B. An extension direction of the first sampling board 3A is opposite to that of the third sampling board 3C. The first sampling board 3A fits snugly with the battery top cover 12, and the third sampling board 3C is connected to the circuit board 4.

To implement fixed connection between the thermally conductive sampling piece 3 and the battery top cover 12, a threaded hole 122 is disposed on the battery top cover 12. As shown in FIG. 2, the threaded hole 122 is located at a center of the temperature sampling region 121.

As shown in FIG. 4, corresponding to the threaded hole 122, a connecting hole 31 is disposed on the sampling board. In this embodiment, the connecting hole 31 is disposed on the first sampling board 3A. After the first sampling board 3A is fitted snugly to the temperature sampling region 121 of the battery top cover 12, the screw 2 is threaded through the connecting hole 31 to threadedly connect to the threaded hole 122 on the battery top cover 12. The first sampling board 3A may be fixedly connected onto the battery top cover 12 to implement fixed connection between the thermally conductive sampling piece and the battery top cover 12.

On the thermally conductive sampling piece 3 according to this embodiment, a relative position between the first sampling board 3A and the third sampling board 3C can be adjusted by appropriately adjusting angles between the first sampling board 3A, the second sampling board 3B, and the third sampling board 3C. In this way, the relative position between the circuit board 4 and the battery top cover 12 is well suited. This helps the thermally conductive sampling piece 3 to fit closely with the battery top cover 12, helps to ensure temperature measurement effects, helps to prevent the thermally conductive sampling piece 3 from pulling the circuit board 4, and helps to prevent damage caused by the thermally conductive sampling piece 3 to the circuit board 4.

In some embodiments, an avoidance hole 32 is disposed at a position of joint between the sampling board and the circuit board 4, and the thermometric element 9 is located in the avoidance hole. As shown in FIG. 4, the avoidance hole 32 is disposed on the third sampling board 3C. The thermometric element 9 is disposed on the circuit board 4 and located in the avoidance hole 32.

In addition, in some embodiments, the thermally conductive sampling piece includes a position limiting structure disposed at the avoidance hole on the sampling board. The position limiting structure is configured to limit a relative position between the thermometric element 9 and the thermally conductive sampling piece.

In some embodiments, a position limiting structure is further disposed on the thermally conductive sampling piece. The position limiting structure is configured to limit a relative position between the circuit board and the thermally conductive sampling piece. The position limiting structure may be disposed in pairs.

The position limiting structure may include a stopper plate disposed on one side of the thermally conductive sampling piece. The stopper plate is snap-fastened to the circuit board 4. The stopper plate may include a first stopper plate and a second stopper plate. The first stopper plate is connected to the thermally conductive sampling piece, and extends toward a side away from the thermally conductive sampling piece. The second stopper plate is connected to the first stopper plate, spaced apart from the thermally conductive sampling piece, and snap-fastened to the circuit board.

As shown in FIG. 4, the position limiting structure includes a stopper plate 33 disposed on the sampling board and located on the side of the avoidance hole. The stopper plate 33 includes a first stopper plate 33A and a second stopper plate 33B that are sequentially connected. The first stopper plate 33A is connected to the sampling board and extends toward a side away from the face of the sampling board. The second stopper plate 33B is spaced apart from the sampling board, and extends from a side on which the avoidance hole 32 is located toward an opposite side of the avoidance hole 32. The thermometric element 9 is located between the second stopper plate and the circuit board 4.

In this embodiment, the third sampling board 3C is connected to a lower side of the circuit board 4, and the position limiting structure is located below the third sampling board 3C.

As shown in FIG. 4, the position limiting structure includes two stopper plates 33 disposed on two opposite sides of the avoidance hole 32. A spacing exists between the second stopper plates 33B of the two stopper plates 33. The thermally conductive sampling piece according to this embodiment may be integrally formed by using a whole strip-shaped board, and the sampling board and the position limiting structure are formed concurrently. After the battery module is assembled, the thermometric element 9 is located between the circuit board 4 and the second stopper plate 33B of the stopper plate 33.

In some embodiments, the thermally conductive sampling piece may be fixedly connected to the battery top cover 12 by a fastener and/or a binder.

The thermometric element 9 and the thermally conductive sampling piece may be connected onto the circuit board 4 by welding. The thermally conductive sampling piece 3 may directly contact the thermometric element 9 so as to transfer heat to the thermometric element 9. The heat of the thermally conductive sampling piece may also be transferred to the thermometric element 9 through a thermally conductive adhesive. The thermally conductive sampling piece and the thermometric element 9 are connected to the circuit board 4 concurrently. A region of connection between the thermally conductive sampling piece and the circuit board 4 is located around a region of connection between the thermometric element 9 and the circuit board 4. The foregoing connection manner shortens a heat transfer path from the battery cell 1 to the thermometric element 9, increases a heat transfer area, and helps to collect the battery temperature accurately and quickly.

The stopper plate 33 facilitates limiting of the relative position between the thermally conductive sampling piece 3 and the circuit board 4 on the one hand, and helps to increase a heat exchange area between the thermally conductive sampling piece 3 and the thermometric element 9 on the other hand, thereby facilitating quick and accurate measurement of the battery temperature.

In this embodiment, the heat in the temperature sampling region 121 on the surface of the battery top cover 12 is conducted to the thermometric element 9 on the circuit board 4 through the thermally conductive sampling piece 3, thereby implementing real-time and accurate sampling of the temperature of the battery cell 1 and monitoring temperature changes of the battery cell 1.

Figure 5:
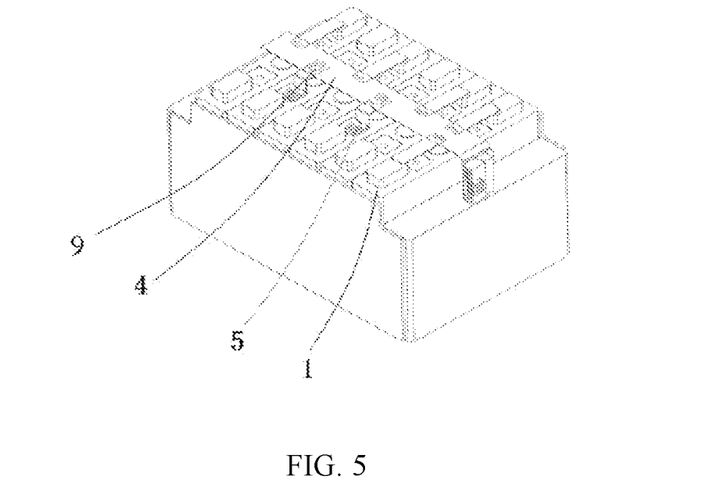
FIG. 5 is a schematic structural diagram of a battery module according to another embodiment of this application.
Figure 6:
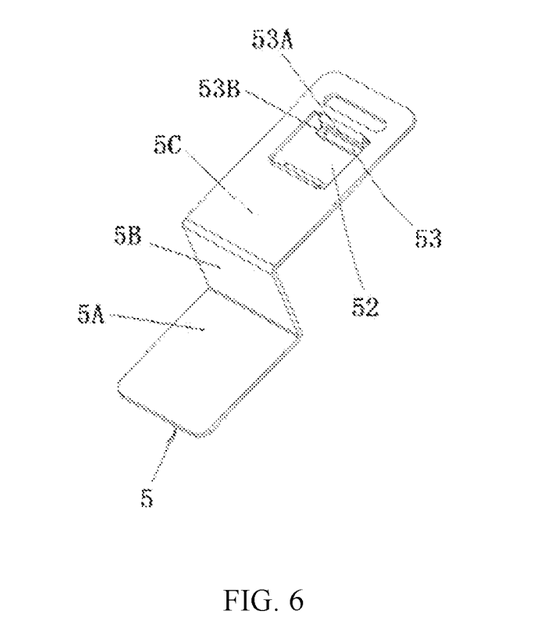
FIG. 6 is a schematic structural diagram of a thermally conductive sampling piece of a battery module according to the embodiment shown in FIG. 5.

FIG. 5 to FIG. 6 show a structure of a battery module according to another embodiment of this application. This embodiment differs from other embodiments in a connection structure between a thermally conductive sampling piece 5 of the battery module and the battery top cover 12.

As shown in FIG. 6, in this embodiment, the thermally conductive sampling piece 5 includes a sampling board. The sampling board includes a first sampling board 5A, a second sampling board 5B, and a third sampling board 5C that are sequentially connected. Both the first sampling board 5A and the third sampling board 5C extend toward a side away from a face of the second sampling board 5B. The first sampling board 5A and the third sampling board 5C extend in opposite directions. The first sampling board 5A fits snugly with the temperature sampling region 121. The third sampling board 5C is connected to the circuit board 4.

As shown in FIG. 6, an avoidance hole 52 is disposed at a position of joint between the sampling board and the circuit board 4. As shown in FIG. 6, the avoidance hole 52 is disposed on the third sampling board 5C. The thermometric element 9 is disposed on the circuit board 4 and located in the avoidance hole 52.

In some embodiments, the thermally conductive sampling piece includes a position limiting structure disposed at the avoidance hole on the sampling board.

As shown in FIG. 6, the position limiting structure includes a stopper plate 53 disposed on the sampling board and located on the side of the avoidance hole. The stopper plate 53 includes a first stopper plate 53A and a second stopper plate 53B that are sequentially connected. The first stopper plate 53A is connected to the sampling board and extends toward a side away from the face of the sampling board. The second stopper plate 53B is spaced apart from the sampling board, and extends from a side on which the avoidance hole 52 is located toward an opposite side of the avoidance hole 52. The thermometric element 9 is located between the second stopper plate 53B and the circuit board 4.

As shown in FIG. 6, the position limiting structure includes two stopper plates 53 disposed on two opposite sides of the avoidance hole 52. A spacing exists between the second stopper plates 53B of the two stopper plates 53. After the battery module is assembled, the thermometric element 9 is located between the circuit board 4 and the second stopper plate 53B of the stopper plate 53.

In this embodiment, the first sampling plate 5A is fixedly connected to the battery top cover 12 by welding, so as to implement fixed connection between the thermally conductive sampling piece 5 and the battery top cover 12.

For content not described in this embodiment, reference may be made to relevant description in the rest of this application.

Figure 7:
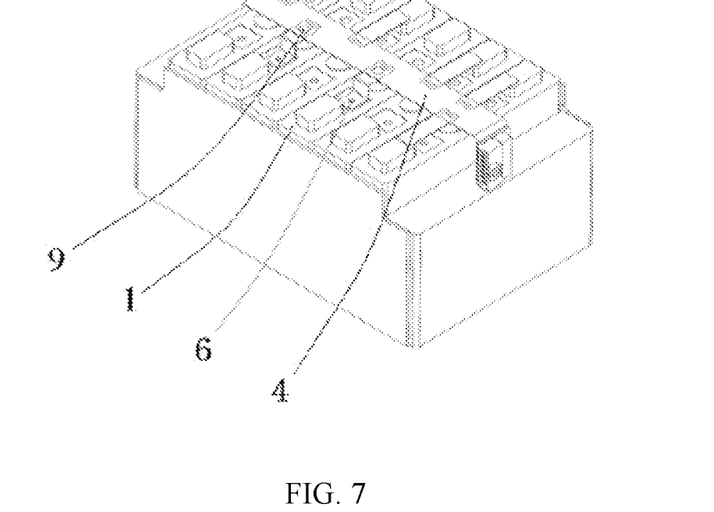
FIG. 7 is a schematic structural diagram of a battery module according to another embodiment of this application.
Figure 8:
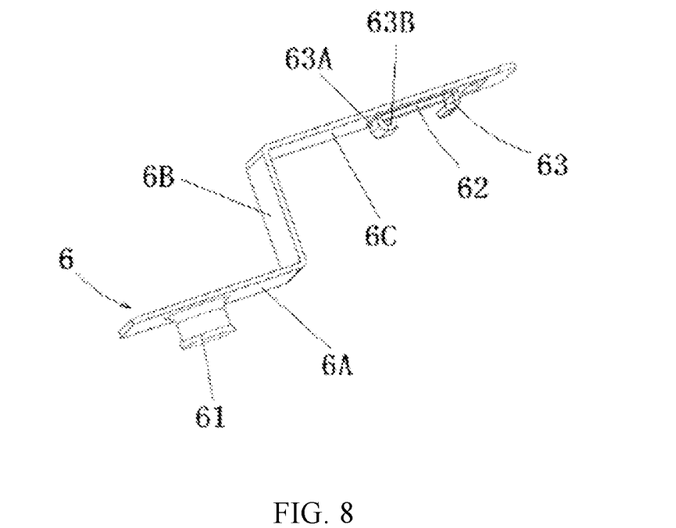
FIG. 8 is a schematic structural diagram of a thermally conductive sampling piece of a battery module according to the embodiment shown in FIG. 7.

FIG. 7 and FIG. 8 show a structure of a battery module according to still another embodiment of this application. This embodiment differs from other embodiments in a connection structure between a thermally conductive sampling piece 6 of the battery module and the battery top cover 12.

As shown in FIG. 8, in this embodiment, the thermally conductive sampling piece 6 includes a sampling board. The sampling board includes a first sampling board 6A, a second sampling board 6B, and a third sampling board 6C that are sequentially connected. Both the first sampling board 6A and the third sampling board 6C extend toward a side away from a face of the second sampling board 6B. The first sampling board 6A and the third sampling board 6C extend in opposite directions. The first sampling board 6A fits snugly with the temperature sampling region 121. The third sampling board 6C is connected to the circuit board 4.

As shown in FIG. 8, an avoidance hole 62 is disposed at a position of joint between the sampling board and the circuit board 4. As shown in FIG. 8, the avoidance hole 62 is disposed on the third sampling board 6C.

The thermometric element 9 is disposed on the circuit board 4 and located in the avoidance hole 62.

The thermally conductive sampling piece includes a position limiting structure disposed at the avoidance hole on the sampling board.

As shown in FIG. 8, the position limiting structure includes a stopper plate 63 disposed on the sampling board and located on the side of the avoidance hole. The stopper plate 63 includes a first stopper plate 63A and a second stopper plate 63B that are sequentially connected. The first stopper plate 63A is connected to the sampling board and extends toward a side away from the face of the sampling board. The second stopper plate 63B is spaced apart from the sampling board, and extends from a side on which the avoidance hole 62 is located toward an opposite side of the avoidance hole 62. The thermometric element 9 is located between the second stopper plate 63B and the circuit board 4.

The position limiting structure includes two stopper plates 63 disposed on two opposite sides of the avoidance hole 62. A spacing exists between the second stopper plates 63B of the two stopper plates 63. After the battery module is assembled, the thermometric element 9 is located between the circuit board 4 and the second stopper plate 63B of the stopper plate 63.

As shown in FIG. 8, in this embodiment, a rivet stud 61 is disposed on the first sampling board 63A. A connecting hole that fits the rivet stud 61 is disposed in a temperature sampling region of the battery top cover 12. After the first sampling board 63A fits snugly with the battery top cover 12, the rivet stud 61 is passed into the connecting hole. The rivet stud 61 and the battery top cover 12 are riveted together with a riveting tool, thereby implementing fixed connection between the first sampling board 63A and the battery top cover 12 and implementing fixed connection between the thermally conductive sampling piece 6 and the battery top cover.

For content not described in this embodiment, reference may be made to relevant description in the rest of this application.

This application is not limited to the foregoing embodiments. For example, in the above embodiments, the third sampling board of the thermally conductive sampling piece is located below the circuit board. However, depending on actual needs, the third sampling board of the thermally conductive sampling piece may also be located above the circuit board. For another example, in the above embodiments, the position limiting structure includes two stopper plates arranged oppositely. In an embodiment not shown in the drawing, the position limiting structure may include 1, 3, or more stopper plates.

An embodiment of this application further provides a vehicle, including a power source and the battery module described above. The power source provides power to the vehicle, and the battery module is configured to provide electrical power to the power source.

Finally, it needs to be noted that the foregoing embodiments are merely intended for describing the technical solutions of this application but not intended as a limitation on this application. Although this application is described in detail with reference to preferred embodiments, a person of ordinary skill in the art understands that the specific embodiments of this application can still be modified or some technical features thereof may be replaced equivalently. Such modifications and equivalent replacements fall within the scope of the technical solutions claimed by this application.

What is claimed is:

1. A battery module, comprising:
   a plurality of battery cells, wherein each battery cell comprises a battery top cover;
   a thermally conductive sampling piece, wherein one end of the thermally conductive sampling piece fits snugly with and is fixedly connected to the battery top cover, and the thermally conductive sampling piece is made of metal;

a flexible circuit board, disposed above the battery top cover, wherein another end of the thermally conductive sampling piece is connected to the flexible circuit board; and a thermometric element, disposed on the flexible circuit board and electrically connected to the flexible circuit board, wherein the thermometric element is configured to collect a temperature signal of the thermally conductive sampling piece and transmit the temperature signal to the flexible circuit board;

wherein each battery cell comprises a top sheet, the top sheet fits snugly with an upper surface of the battery top cover, a temperature collection opening is made on the top sheet, the portion of the battery top cover exposed by the temperature collection opening is a temperature sampling region, and the thermally conductive sampling piece fits snugly with and is fixedly connected to the temperature sampling region.

2. The battery module according to claim 1, wherein the thermally conductive sampling piece comprises a sampling board, and the sampling board comprises a first sampling board, a second sampling board and a third sampling board, the first sampling board is fitted snugly with the battery top cover, the second sampling board is connected with the first sampling board and the third sampling board, the third sampling board is connected to the flexible circuit board.

3. The battery module according to claim 2, wherein the sampling board is bent, the first sampling board and the third sampling board are located on two sides of the second sampling board respectively, and extend in a direction away from the second sampling board.

4. The battery module according to claim 2, wherein a hole is disposed on the third sampling board, and the thermometric element is disposed on the part corresponding to the hole of the flexible circuit board.

5. The battery module according to claim 1, wherein the thermally conductive sampling piece is fixedly connected to the battery top cover by a fastener and/or a binder.

6. The battery module according to claim 1, wherein a position limiting structure is disposed on the thermally conductive sampling piece, and the position limiting structure is configured to limit a relative position between the flexible circuit board and the thermally conductive sampling piece.

7. The battery module according to claim 6, wherein the position limiting structure comprises a stopper plate disposed on one side of the thermally conductive sampling piece, and the stopper plate is snap-fastened to the flexible circuit board.

8. The battery module according to claim 7, wherein the stopper plate comprises:
a first stopper plate, connected to the thermally conductive sampling piece, and extending toward a side away from the thermally conductive sampling piece; and
a second stopper plate, connected to the first stopper plate, spaced apart from the thermally conductive sampling piece, and snap-fastened to the flexible circuit board.

9. The battery module according to claim 8, wherein a hole is disposed at a position of joint between the thermally conductive sampling piece and the flexible circuit board, and the second stopper plate extends from a side on which the hole is located toward an opposite side of the hole.

10. The battery module according to claim 6, wherein the position limiting structure is disposed in pairs, and the number of the position limiting structure is at least one pair.

11. The battery module according to claim 1, wherein a hole is disposed at a position of joint between the thermally conductive sampling piece and the flexible circuit board, and the thermometric element is disposed on the part corresponding to the hole of the flexible circuit board.

12. The battery module according to claim 1, wherein a threaded hole is disposed on the battery top cover, the thermally conductive sampling piece comprises a sampling board, a connecting hole is disposed on the sampling board, the thermally conductive sampling piece is configured to be threaded with the threaded hole through the connecting hole by a screw, so that the thermally conductive sampling piece is fixedly connected onto the battery top cover.

13. A vehicle, comprising:
a power source, wherein the power source provides power to the vehicle; and
a battery module, wherein the battery module is configured to provide electrical power to the power source, and the battery module comprises:
a plurality of battery cells, wherein each battery cell comprises a battery top cover;
a thermally conductive sampling piece, wherein one end of the thermally conductive sampling piece fits snugly with and is fixedly connected to the battery top cover, and the thermally conductive sampling piece is made of metal;
a flexible circuit board, disposed above the battery top cover, wherein another end of the thermally conductive sampling piece is connected to the flexible circuit board; and
a thermometric element, disposed on the flexible circuit board and electrically connected to the flexible circuit board, wherein the thermometric element is configured to collect a temperature signal of the thermally conductive sampling piece and transmit the temperature signal to the flexible circuit board;
wherein each battery cell comprises a top sheet, the top sheet fits snugly with an upper surface of the battery top cover, a temperature collection opening is made on the top sheet, the portion of the battery top cover exposed by the temperature collection opening is a temperature sampling region, and the thermally conductive sampling piece fits snugly with and is fixedly connected to the temperature sampling region.

\* \* \* \* \*